United States Patent [19]

Noomen et al.

[11] Patent Number: 4,929,661

[45] Date of Patent: May 29, 1990

[54] AQUEOUS COATING COMPOSITION CONTAINING A FUNCTIONAL ORGANIC COMPOUND, A CURING AGENT, AND A DISPERSING AGENT

[75] Inventors: Arie Noomen; Petrus J. Peters, both of Voorhout, Netherlands

[73] Assignee: Akzo N.V., Arnhem, Netherlands

[21] Appl. No.: 425,515

[22] Filed: Oct. 20, 1989

Related U.S. Application Data

[63] Continuation of Ser. No. 100,670, Sep. 24, 1987, abandoned.

[30] Foreign Application Priority Data

Sep. 24, 1986 [NL] Netherlands ............................. 8602412
Jul. 20, 1987 [NL] Netherlands ............................. 8701708

[51] Int. Cl.$^5$ ................................................. C08K 5/17
[52] U.S. Cl. ...................................... 524/259; 524/309; 524/376; 524/804; 525/180; 525/426
[58] Field of Search ................ 524/259, 309; 525/180, 525/426

[56] References Cited

U.S. PATENT DOCUMENTS

| | | | |
|---|---|---|---|
| 4,134,865 | 1/1979 | Tominaga | 524/901 |
| 4,146,546 | 3/1979 | Braun et al. | 260/17 R |
| 4,317,894 | 3/1982 | Lewarchik et al. | 525/426 |
| 4,359,556 | 11/1982 | Lakshmanan et al. | 525/426 |
| 4,598,108 | 6/1986 | Hoefs | 525/113 |
| 4,772,680 | 9/1988 | Noomen et al. | 525/113 |

FOREIGN PATENT DOCUMENTS

| | | | |
|---|---|---|---|
| 0055477 | 7/1982 | European Pat. Off. | |
| 2075022 | 11/1981 | United Kingdom | 524/259 |

*Primary Examiner*—Joseph L. Schofer
*Assistant Examiner*—Mark D. Sweet
*Attorney, Agent, or Firm*—Louis A. Morris; Shirley L. Church

[57] ABSTRACT

The invention provides an aqueous coating composition curable at ambient temperature comprising a polyacetoacetate; a polyamino amide having an amine number of 60–1000; and either a nitroalkane, a formic acid ester, or an organic compound occurring in at least 2 tautomeric forms, and in one of the tautomeric forms a labile hydrogen atoms is linked to a carbon atom. A process of coating a substrate with such composition is also provided.

26 Claims, No Drawings

AQUEOUS COATING COMPOSITION CONTAINING A FUNCTIONAL ORGANIC COMPOUND, A CURING AGENT, AND A DISPERSING AGENT

This is a continuation of application Ser. No. 07/100,670 filed September 24, 1987 now abandoned.

The invention relates to an aqueous coating composition based on an organic compound and a curing agent for it. Aqueous compositions have the important advantage that upon application no or upon use of a co-solvent only little organic solvent is released into the atmosphere. Moreover, the use of water leads to fewer physiological drawbacks and fire and explosion hazards.

The coating composition according to the invention is characterized in that the organic compound is a compound having at least 2 acetoacetate groups and the curing agent is a polyamino amide having an amine number of 60–1000 built up from a mono- and/or dicarboxylic acid having 2–40 carbon atoms and a polyamine having 2–6 primary amino groups and 2–20 carbon atoms, and the coating composition further comprises a nitroalkane having 1–6 carbon atoms, an organic compound occurring in at least 2 tautomeric forms, and in one of the tautomeric forms a labile hydrogen atom is linked to a carbon atom and which compound contains at least one carbonyloxy group or sulphonyl group, and/or a formic acid ester having a solubility of at least 0.2 g in 100 g of water having a temperature of 20° C., with the exception of tert.butyl formiate.

Suitable compounds containing at least two acetoacetate groups may be obtained by reacting diketene or an alkyl acetoacetate with a polyol having two or more hydroxyl groups.

As examples of polyols may be mentioned ethylene glycol, propylene glycol, trimethylol propane and pentaerythritol, polyether polyols as obtained by reacting an alkylene oxide with a hydroxy compound containing 2 or more hydroxyl groups, polyester polyols such as polycaprolactone polyols, and epoxy resins as obtained by reacting epichlorohydrin with a diaryloyl alkane. It is preferred that use should be made of addition polymers having acetoacetate groups.

Examples of suitable acetoacetate groups-containing addition polymers that may be used according to the invention include addition polymers, 4–100% by weight of which consists of a monomer unit having one or more acetoacetate groups, 0–96% by weight of an acrylic or methacrylic ester of a mono-, di-or polyfunctional hydroxyl compound having 1–18 carbon atoms, 0–20% by weight of a monoethylenically unsaturated mono- or dicarboxylic acid having 3–12 carbon atoms or an anhydride thereof, and 0–96% by weight of one or more other copolymerizable monomers, such as styrene, α-methyl styrene, vinyl toluene, acrylamide, methacrylamide, acrylonitrile, N-methylol acrylamide, dimethyl maleinate, vinyl acetate, vinyl versatate, vinyl trimethoxy silane and/or allyl glycidyl ether.

Examples of suitable monomer units having one or more acetoacetate groups include acetoacetic esters of a hydroxyalkyl (meth)acrylate or an allyl alcohol monomer unit or compounds of the general formula

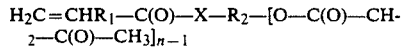

wherein the group $R_1$ represents a hydrogen atom or a methyl group, the group X an oxygen atom or an NH-group and the group $R_2$ is an n-functional organic group having 1–26 carbon atoms and n is a number of 2–4; the molecular weight of such a monomer unit is generally not higher than 500, preferably 140–300. The n-functional organic group $R_2$ may contain urethane groups, ether groups and/or ester groups, for example obtained from a lactone, such as ε-caprolactone, or an epoxy compound or isocyanate compound such as an alkylene oxide, glycidol, a glycidyl ester of a monocarboxylic acid containing 2–18 carbon atoms or an adduct of a diisocyanate and a diol. These monomer units are obtained for instance by acetoacetylation of an adduct of a lactone, a monepoxy compound or a diisocyanate reacted with a diol to a hydroxyalkyl (meth)acrylate. Examples of other suitable monomer units include allyl acetoacetate and acetoacetic esters of ethylenically unsaturated diols or triols such as 2-butene-1,4-diacetoacetate and (2-methylene acetoacetyl)-1-propene-3-acetoacetate.

Examples of suitable acrylic or methacrylic esters of a mono-, di-or poly-functional hydroxyl compound include methyl acrylate, methyl methacrylate, ethyl acrylate, hydroxyethyl acrylate, hydroxyethyl methacrylate, propyl acrylate, hydroxypropyl methacrylate, butyl acrylate, butyl methacrylate, hydroxyhexyl acrylate, 2-ethylhexyl acrylate, octyl acrylate, isobornyl acrylate, oleyl acrylate, glycidyl methacrylate or (meth)acryloxypropyl trimethoxysilane.

As examples of suitable monoethylenically unsaturated mono-or dicarboxylic acids containing 3–12 carbon atoms or an anhydride thereof may be mentioned acrylic acid, methacrylic acid, maleic acid, itaconic acid, maleic anhydride, cinnamic acid or dodecenic acid.

The addition polymers may be prepared in any convenient manner, for instance by polymerizing a one or more acetoacetate groups-containing monomer, optionally mixed with one or more other monomers, at a temperature of 50°–160° C., in the presence of preferably 0.1–10% by weight of an initiator, calculated on the monomeric compound(s). Examples of suitable initiators include free radical initiators, for instance potassium persulphate, hydrogen peroxide, cumene hydroperoxide, benzoyl peroxide, di-tert.butyl peroxide, tert. butylpertrimethyl hexanoate, tert. butyl perbenzoate, azobisisobutyronitrile, azobisvaleronitrile, and azobis(2,4-dimethylvaleronitrile). The polymerization is carried out in the presence of water and/or an organic solvent, such as a ketone, an alcohol, an ether, an ester or a hydrocarbon. The polymerization may optionally be carried out by using UV light and in the presence of UV initiators, such as benzil, benzoin ethers and thioxanthone derivatives.

Other suitable acetoacetate groups-containing addition polymers are addition polymers having, for instance hydroxyl groups, a number of which have been converted with a reactive acetoacetate compound or a compound yielding an acetoacetate group, for instance with diketene. Examples of suitable reactive acetoacetate compounds include alkyl esters of acetylacetic acid, preferably methyl acetoacetate or ethyl acetoacetate. Suitable hydroxyl groups-containing addition polymers include copolymers of a hydroxyalkyl (meth)acrylate such as hydroxyethyl methacrylate, hydroxypropyl methacrylate and/or hydroxybutyl acrylate and optionally one or more other comonomers, or copolymers of styrene and allyl alcohol.

The polyamino amide which according to the invention may be used as second component of the composition is obtained by reacting a mono- and/or dicarboxylic acid having 2–40 carbon atoms and a polyamine having 2–6 primary amino groups and 2–20 carbon atoms. Examples of suitable monocarboxylic acids, which preferably contain 1–24 carbon atoms, include acetic acid, propionic acid, valeric acid, capronic acid, trimethyl acetic acid, caprylic acid, pelargonic acid, isooctanoic acid, lauric acid, myristic acid, palmitic acid, stearic acid, behenic acid or cerotic acid; aliphatic monocarboxylic acids having one or more conjugated or non-conjugated double C-C bonds, which generally contain 5–24 carbon atoms, such as linseed oil fatty acid, safflower oil fatty acid, soybean oil fatty acid, tall oil fatty acid, wood oil fatty acid, sunflower oil fatty acid, castor oil fatty acid, oiticica oil fatty acid, dehydrated castor oil fatty acid, linoleic acid, linolenic acid, oleic acid, sorbic acid, elaidic acid, α-eleostearic acid, β-eleostearic acid, ricinolic acid, crucic acid, isanic acid or isanolic acid; cycloaliphatic monocarboxylic acids such as cyclopentane monocarboxylic acid, cyclopentane propionic acid and cyclohexane monocarboxylic acid; and aromatic monocarboxylic acids such as benzoic acid and p.tert. butyl benzoic acid.

As examples of suitable dicarboxylic acids, which preferably contain 8–36 carbon atoms, may be mentioned aliphatic dicarboxylic acids such as oxalic acid, malonic acid, succinic acid, glutaric acid, adipic acid, azelaic acid, 2,2,4-trimethyl adipic acid, sebacic acid, dimeric fatty acids generally containing 36 carbon atoms; cycloaliphatic dicarboxylic acids such as hexahydrophthalic acid, hexahydroterephthalic acid, tetrahydrophthalic acid, endomethylene tetrahydrophthalic acid or methylcyclohexane-1,2-dicarboxylic acid; and aromatic dicarboxylic acids such as orthophthalic acid, isophthalic acid or terephthalic acid. Also suitable are, of course, mixtures of the above-envisaged mono- and/or divalent carboxylic acids. In addition to the above-mentioned carboxylic acids other carboxylic acids may be used, such as trimellitic acid, and trimerised fatty acids, which acids may be employed in a relatively small amount of not higher than, for instance 30% by weight, preferably less than 10% by weight, calculated on the total amount of carboxylic acid.

The carboxylic acids may, if desired, contain inert substituents, for instance: halogen, nitro, aceto, or alkyl ether groups. If desired, the above-envisaged acids also may be used as anhydride or acid halide, or in the form of an ester, for instance an ester derived from an alcohol having 1 to 6 carbon atoms.

Polyamines from which according to the invention the polyamino amide is partly built up are polyamines having 2–6 primary and 0–6 secondary amino groups, preferably 2–3 primary and 0–4 secondary amino groups. Examples of suitable polyamines are 3-amino-1-(methylamino)propane, 3-amino-1-(cyclohexylamino)-propane, N-(2-hydroxyethyl)ethylene diamine, more particularly polyamines of the formula

wherein the group $R_1$ and the n groups $R_2$ may be the same or different and represent an alkylene group having 2–6 carbon atoms and preferably 2–4 carbon atoms and n is a number from 1–6, preferably 1–3. By an alkylene group is also to be understood here a cycloalkylene group or an alkylene group having an ether-oxygen atom. Representative polyalkylene polyamines include diethylene triamine, dipropylene triamine, dibutylene triamine, dihexylene triamine, triethylene tetramine, tetraethylene pentamine, tetrapropylene pentamine, pentaethylene hexamine or polyamino compounds having different alkylene groups in a molecule, for instance:

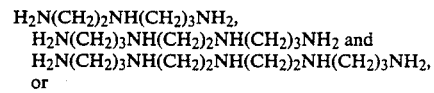

or mixtures of the above-envisaged compounds. The two last-mentioned compounds may be prepared for instance by addition of ethylene diamine or diethylene triamine to acrylonitrile, followed by hydrogenation of the product thus prepared. Preferred polyamines from which according to the invention the polyamino amide is also partly built up are aliphatic, cycloaliphatic or aromatic amino compounds having 2 or 3 exclusively primary amino groups. Examples of such polyamines include ethylene diamine, propylene diamine, butylene diamine, pentamethylene diamine, hexamethylene diamine, decamethylene diamine, 4,7-dioxadecane-1,10-diamine, dodecamethylene diamine, 4,9-dioxadodecane-1,12-diamine, 7-methyl-4,10-dioxatridecane-1,13-diamine, 1,2-diamino cyclohexane, 1,4-diamino cyclohexane, 4,4'-diamino dicyclohexyl methane, bis(3-methyl-4-amino cyclohexyl)methane, 2,2-bis(4-amino cyclohexyl)propane, (3-methyl-4-amino cyclohexyl)-(3-methyl-4-amino phenyl)methane, 4,4'-diamino diphenyl methane, diamino diphenyl sulphone, bis(3-methyl-4-aminophenyl)methane and bis-(3-amino propyl)methylamine.

The polyamino amide may be prepared in any well-known or convenient manner from the mono- and/or dicarboxylic acid and one or more polyamines, for instance by reacting the reaction components with each other at a temperature generally of 100°–220° C., preferably 115°–190° C. Usually, no solvent is applied, but it is self-evident that one or more solvents, for instance methanol, may optionally be employed. In the reaction mixture the carboxylic acid is usually present in an amount such that according to the invention a polyamino amide having an amine number of 60–1000, preferably of 80–750 and more particularly of 200–600 is obtained. These polyamino amides also may be applied as adduct to a compound having one or more epoxy groups. To prolong the pot life the polyamino amides may optionally be applied in the form of the ketimine or aldimine of the polyamino amide with ketones such as methylethyl ketone, diethyl ketone, methylisobutyl ketone or methylamyl ketone, or aldehydes, such as formaldehyde, acetaldehyde or isobutyraldehyde.

In addition to the polyamino amide still other amino compounds may be present. As examples of such amino compounds, which are preferably use in aldiminated or ketiminated form may be mentioned aliphatic or cycloaliphatic amines having at least one, preferably 2 to 4, primary amino groups and 2–24 carbon atoms and, more particularly, a molecular weight not higher than 580. It is preferred that these amines should have 0–6 secondary amino groups. Examples of suitable amino compounds include ethylene diamine, propylene diamine, ethanolamine, propanolamine, butylene diamine, pentamethylene diamine, hexamethylene diamine, decamethylene diamine, 4,6-dioxadecane-1,10-diamine, dodecamethylene diamine, 4,9-dioxadodecane-1,12-diamine, 7-methyl-4,10-dioxatridecane-1,13-diamine, 1,2-diaminocyclohexane, 1,4-diaminocyclohexane, 4,4'- diaminodicyclohexyl methane, isophorone diamine, bis-(3-methyl-4-aminocyclohexyl)methane, 2,2-bis-(4-aminocyclohexyl)propane, nitrile tris(ethane amine), polyether polyamines, for instance those that are known under the trade mark Jeffamine of Jefferson Chemical Company, bis-(3-aminopropyl) methylamine, 3-amino-1-(methylamino)propane, 3-amino-1-(cyclohexylamino)propane, N-(2-hydroxyethyl)ethylene diamine and polyamines of the formula $H_2N-(R_2-NH)_n-R_1-NH_2$, wherein the group $R_1$ and the n groups $R_2$ may be the same or different and represent an alkylene group containing 2–6, and preferably 2–4 carbon atoms and n is a number from 1–6 and preferably 1–3. By an alkylene group is also to be understood here a cycloalkylene group or an alkylene group containing an ether-oxygen atom. Examples of representative polyalkylene polyamines include diethylene triamine, dipropylene triamine and dibutylene triamine. Other suitable amino compounds are adducts of a polyamine or a hydroxylamine to a monoepoxy compound, a monoisocyanate or a monofunctional $\alpha,\beta$-ethylenically unsaturated carbonyl compound.

Other suitable amino compounds which may optionally be used are adducts of a di- or polyvalent epoxy or isocyanate compound or $\alpha,\beta$-ethylenically unsaturated carbonyl compound and an amino compound containing at least 1 primary amino group and a group reacting with the di- or polyvalent compound.

As examples of suitable epoxy compounds, which as such may be solid or liquid, may be mentioned the di- or polyglycidyl ethers of (cyclo)aliphatic or aromatic hydroxyl compounds, such as ethylene glycol, glycerol, cyclohexane diol, mono- or polynuclear di- or trifunctional phenols, bisphenols such as Bisphenol-A and Bisphenol-F; polyglycidyl ethers of phenol formaldehyde novolak; polymers of ethylenically unsaturated compounds having epoxy groups, such as glycidyl (meth)acrylate, N-glycidyl (meth)acrylamide and/or allylglycidyl ether, and optionally of one or more other copolymerizable ethylenically unsaturated monomers; cycloaliphatic epoxy compounds such as epoxidized styrene or divinyl benzene which may optionally, subsequently, be hydrogenated; glycidyl esters of fatty acids containing, for instance, 6–24 carbon atoms; glycidyl (meth)acrylate; epoxy compounds containing an isocyanurate group; an epoxidized polyalkadiene such as epoxidized polybutadiene; hydantoin-epoxy resins; epoxy resins obtained by epoxidizing aliphatic and/or cycloaliphatic alkenes, such as dipentene dioxide, dicyclopentadiene dioxide and vinyl cyclohexene dioxide, and glycidyl groups-containing resins such as polyesters or polyurethanes containing one or more glycidyl groups per molecule, or mixtures of the above-envisaged epoxy resins. The epoxy resins are known to a skilled person and need not be further described here. It is preferred that the epoxy resin to be used should be a diglycidyl ether based on bis(4-hydroxyphenyl)-2,2-propane. The preferred epoxy equivalent weight of the epoxy resin(s) is in the range of 87 to 6000, more particularly 120–1000.

Examples of suitable isocyanate compounds include aliphatic, cycloaliphatic or aromatic di-, tri- or tetraisocyanates which may or may not be ethylenically unsaturated, such as 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, 2,4,4-trimethyl hexamethylene diisocyanate, dodecamethylene diisocyanate, $\omega,\omega'$-dipropyl ether diisocyanate, 1,3-cyclopentane diisocyanate, 1,2-cyclohexane diisocyanate, 1,4-cyclohexane diisocyanate, isophorone diisocyanate, 4-methyl-1,3-diisocyanatocyclohexane, trans-vinylidene diisocyanate, dicyclohexylmethane-4,4'-diisocyanate, 3,3'-dimethyl-dicyclohexylmethane-4,4'-diisocyanate, a toluene diisocyanate, 1,3-bis(1-isocyanato-1-methylethyl)-benzene, 1,4-bis(1-isocyanato-1-methylethyl)benzene, 1,3-bis(isocyanatomethyl)benzene, a xylylene diisocyanate, 1,5-dimethyl-2,4-bis(isocyanatomethyl)benzene, 1,5-dimethyl-2,4-bis(2-isocyanatoethyl)benzene, 1,3,5-triethyl-2,4-bis(isocyanatomethyl)benzene, 4,4'-diisocyanatodiphenyl, 3,3'-dichloro-4,4'-diisocyanatodiphenyl, 3,3'-diphenyl-4,4'-diisocyanatodiphenyl, 3,3'-dimethoxy-4,4'-diisocyanatodiphenyl, 4,4'-diisocyanatodiphenylmethane, 3,3'-dimethyl-4,4'-diisocyanatodiphenyl methane, a diisocyanatonaphthalene, polyisocyanates having isocyanurate structural units, the adduct of 2 molecules of a diisocyanate, such as hexamethylene diisocyanate or isophorone diisocyanate, and a diol such as ethylene glycol, the adduct of 3 molecules of hexamethylene diisocyanate and 1 molecule of water (available under the trademark Desmodur N of Bayer), the adduct of 1 molecule of trimethylol propane and 3 molecules of toluene diisocyanate (available under the trademark Desmodur L of Bayer), the adduct of 1 molecule of trimethylol propane and 3 molecules of isophorone diisocyanate, compounds such as 1,3,5-triisocyanato benzene and 2,4,6-triisocyanatotoluene, and the adduct of 1 molecule of pentaerythritol and 4 molecules of toluene diisocyanate.

Examples of suitable polyfunctional $\alpha,\beta$-ethylenically unsaturated compounds include the (meth)acrylic esters of di-, tri-or polyvalent hydroxyl compounds, including polyester diols or polyols and polyether diols or polyols; alkyd resins and hydroxyl-functional (meth)acryl or vinyl (co)polymer resins; adducts of on the one hand a hydroxyl group-containing (meth)acrylic ester of a polyol to an at least bifunctional isocyanate compound or epoxy compound on the other; and adducts of (meth)acrylic acid to an at least bifunctional epoxy compound. For brevity, the compounds envisaged here are hereinafter referred to as poly(meth)acryloyl compound.

The hydroxyl groups-containing (meth)acrylic esters from which the adduct to the at least bifunctional isocyanate or epoxy compound is formed are the (meth)acrylic esters of polyols defined hereinbefore. As examples of an at least bifunctional isocyanate compound or epoxy compound suitable for the formation of the aforementioned adduct may be mentioned those isocyanate compounds and epoxy compounds already mentioned hereinbefore as component of the adduct of an amine compound to a polyfunctional isocyanate compound or epoxy compound. The poly(meth)acryloyl compound generally has an equivalent weight of 85–5000, preferably of 100–1000. The $\alpha,\beta$-ethylenically unsaturated compound that may be used in the formation of the adduct to the amino compound is preferably a poly(meth)acryloyl compound mentioned hereinbefore. Optionally, use may be made of a compound having one or more $\alpha,\beta$-ethylenically unsaturated dicarboxylic acid units, such as maleic acid or fumaric acid or an ester thereof.

The amino compounds that are used in the formation of the adduct thereof to the polyfunctional epoxy compound or isocyanate compound or α,β-ethylenically unsaturated carbonyl compound may in the first place be the afore-mentioned polyamino compounds preferably containing 2-24 carbon atoms or, optionally, monoamines, preferably primary monoamines which have a group, for instance a hydroxyl group or mercaptan group, reacting with an epoxy compound or isocyanate compound or an α,β-ethylenically unsaturated carbonyl compound. It is preferred that use should be made of a mixture of a polyamino amide and an amino compound in which the amount of the polyamino amide is at least 3, and preferably at least 5 equivalent %. The polyamino amide is preferably used in the non-blocked form and the amino compound in the blocked form.

For use in the coating composition according to the invention the amino groups of the afore described amino compounds may be blocked with an aldehyde or ketone containing not more than 10 carbon atoms, preferably 3-8 carbon atoms. Examples of suitable blocking agents for the amino groups include acetone, methylethyl ketone, diethyl ketone, methylisopropyl ketone, methylisobutyl ketone, isobutyraldehyde, cyclohexanone, ethylamyl ketone, diisobutyl ketone, 3-octanone and decanone. It is preferred that use should be made of an aliphatic or cycloaliphatic ketone, more particularly containing 3-8 carbon atoms.

An effective method of preparing the above-envisaged blocked amino compound is, for example, the addition reaction of the epoxy or isocyanate compound or the α,β-ethylenically unsaturated carbonyl compound referred to hereinbefore and an amino-, hydroxyl- or mercaptan-functional ketimine or aldimine. Optionally, the amino group(s) may be blocked after the addition reaction. The blocking of amino groups is known per se and need not be further described here.

In the coating composition according to the invention the polyacetoacetate, the polyamino amide and possibly the amino compound are usually present in amounts such that the ratio of the number of equivalents of primary amino groups of the polyamino amide and the amino compound(s), if present, to the number of equivalents of acetoacetate of the polyacetoacetate is in the range of ½ to 2, preferably of ⅔ to 4/3.

According to the invention the aqueous composition also contains a nitroalkane, a formic acid ester and/or a certain organic compound occurring in at least 2 tautomeric forms, and in one of the tautomeric forms a labile hydrogen atom is linked to a carbon atom. For brevity, these last-mentioned compounds are hereinafter referred to as CH acid. It has surprisingly been found that the compounds referred to hereinbefore exert an emulsifying action on the present binder system containing a polyamino amide, providing an excellent dispersibility of the binder system in water. Examples of CH acids include 2,4-pentanedione, 1,1,1-trifluoro-2,4 pentanedione, phenylsulphonylpropanone-2, 3-methyl-2,4-pentanedione, and esters, for instance those of a (cyclo)aliphatic or aromatic hydroxyl compound having 1-10 carbon atoms, such as methanol, ethanol, butanol, hexanol, cyclohexanol, phenol, ethylene glycol, glycerol, trimethylol ethane and trimethylol propane, and a carboxylic acid, such as nitroacetic acid, cyanoacetic acid, trifluoroacetic acid, acetyl acetic acid or malonic acid. Examples of suitable esters include ethyl nitroacetate, cyclohexyl nitroacetate, benzyl cyanoacetate, ethyl trifluoroacetoacetate, methyl acetoacetate, ethyl acetoacetate, phenyl acetoacetate and diethyl malonate. It is preferred that use should be made of 2,4-pentanedione, methyl acetoacetate or ethyl acetoacetate or methyl cyanoacetate. The CH acid generally has a pka of 3-12, preferably 4-11 and more particularly of 6½-9.

It is preferred that the formic acid ester should be an ester formic acid and a monovalent alcohol having 1-6, more particularly 1-5 carbon atoms. Examples of suitable alcohols include methanol, ethanol, n-propanol, isopropanol, n-butanol, isobutanol, n-pentanol, isopentanol and ether alcohols such as 2-ethoxyethanol, 2-propoxyethanol and 2-butoxyethanol. More particularly, the ester is a formic acid ester of the general formula

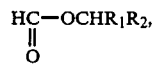

wherein $R_1$ and $R_2$ may be the same or different and represent a hydrogen atom or an alkyl group, the groups $R_1$ and $R_2$ together containing not more than 5 carbon atoms. A specially preferred ester is methyl formiate, ethyl formiate or isopropyl formiate. Other suitable esters are the esters of formic acid and a bi- or polyvalent hydroxy compound having 2-8 carbon atoms. As examples of suitable hydroxy compounds may be mentioned ethylene glycol, propylene glycol, glycerol, trimethylol propane and pentaerythritol. Optionally, the formic acid ester may contain one or more hydroxyl groups. It is preferred that the formic acid ester should have a solubility of 0.2-50 g, more particularly 0.5-35 g in 100 g of water having a temperature of 20° C. The CH acid is usually employed in an amount such that per N atom of the amino group-containing curing agent 0.3-2 labile H atoms of the CH acid are present.

Suitable nitroalkanes have 1 to 6, and preferably 1-4 carbon atoms and contain one or two nitro groups. As examples may be mentioned nitromethane, nitroethane, 1- and 2-nitropropane, 1- and 2-nitrobutane and 1,3-dinitropropane. It is preferred that nitroethane or nitropropane should be applied. The formic acid ester is generally present in an amount such that 0.3-2 equivalents of formiate are present per equivalent of nitrogen of the amino group-containing curing agent.

The aqueous coating compositions may be formed from the polyacetoacetate, the polyamino amide and the nitroalkane, formic acid ester and/or CH acid in any convenient manner. It is preferred that the polyacetoacetate should be dissolved in an appropriate organic solvent and subsequently mixed with a solution of the polyamino amide in an appropriate organic solvent. In actual practice the nitroalkane, formic acid ester and/or the CH acid is either added to the solution of the polyacetoacetate or to the common solution of the polyacetoacetate and the polyamino amide.

To obtain the desired application viscosity water is added to the final solution. The aqueous composition may contain the usual additives, such as pigments, fillers, levelling agents, foam suppressing agents, rheology control agents, corrosion inhibitors and inert organic solvents, such as an aliphatic or aromatic hydrocarbon, and compounds such as butyl glycol. Optionally, pigment may previously be mixed with a solution of the binder or a component thereof in an organic solvent.

The coating composition ready for use generally contains water in an amount of at least 15% by weight, preferably at least 25% by weight and generally not more than 80% by weight.

The coating composition may be applied to the substrate in any suitable manner, such as by roller coating, spraying, brushing, sprinkling, flow coating or dipping. It is preferred that the composition should be applied by (electrostatic) spraying. The invention also pertains to a process of coating a substrate using the aqueous compositions referred to hereinbefore.

The substrate may be of, for instance, a metal such as aluminium, magnesium, steel, iron, titanium; of a synthetic material such as a fibre-reinforced epoxy resin, polyether-ether ketone, polyimide or polyester; or concrete or asbestos cement. The substrate may or may not have been pretreated. The coating is generally cured at ambient or elevated temperature, for instance up to not higher than 80° C. The coating thickness (after curing) is generally in the range of 10-200 μm. The coating composition according to the invention is harmless to the environment and hard curing, and after curing it is excellently resistant to organic solvents such as petrol, and to water. The composition can be excellently used as primer or top coat in the automobile and car repair industry, as decorative coat on concrete and as abrasion resistant coat on wood or concrete.

The invention will be further described in the following examples, which are not to be construed as limiting the scope of the present invention. The term "parts" used therein refers to "parts by weight" and "%" to "per cent by weight". The coating thickness of the compositions was determined after the composition had been cured. The resistance of the coating to water and premium grade petrol was determined after 1 week's drying by placing on a panel a wad of cotton wool soaked with water for 2 hours or with premium grade petrol for 2 minutes, after which the appearance was visually assessed for hazing and decrease in hardness by scratching with a pencil of a 2B hardness. When no hazing or decrease in hardness is found, the result is rated "excellent". The result is rated "very good", when no decrease in hardness, but only slight hazing is observed, and the result is rated "good", when besides slight hazing a slight reduction in hardness is established which, however, will have disappeared after drying of the coating.

PREPARATION OF POLYACETOACETATES A-D

Polyacetoacetate A

Into a reactor were charged 900 g of solvent, which were heated to boiling temperature. Subsequently, a mixture of 451.9 g of butyl acrylate, 461.2 g of styrene, 230.5 g of methyl methacrylate and 556.6 g of hydroxymethyl methacrylate and a mixture of 125 g of solvent and 119.0 g of tert. butylperoxy-3,5,5 trimethyl hexanoate were added separately over a period of 3 hours. Thereupon, a mixture of 8.5 g of tert. butylperoxy-3,5,5 trimethyl hexanoate and 75 g of solvent was added over a period of 30 minutes. Then 22 g of solvent were added. The reaction mixture was kept at boiling temperature until a conversion of more than 98% had been attained. Next, the reaction mixture was cooled and 3.4 g of dibutyltin oxide, 463.6 g of ethyl acetoacetate and 225 g xylene were added, after which the reaction mixture was heated to boiling temperature, with the ethanol evolved being removed by (azeotropic) distillation. After 6 hours 189.0 g of ethanol (100% of the theoretical amount) were collected. After 38 g of solvent had been added, a 61.4%-solution of acetoacetate compound A having an acid number of 1.1 and a viscosity of 36.8 cPas was obtained. The solvent used in this example was a hydrocarbon mixture (available under the trade mark Solvesso 100 of Esso).

Polyacetoacetate B

Into a reactor were charged 335 g of trimethylol propane, 926.3 g of ethyl acetoacetate, 417.9 g of xylene and 2.5 g of dibutyltin oxide, which were heated to boiling temperature, the ethanol evolved being removed by (azeotropic) distillation. After 6 hours 314.0 g of ethanol had been distilled off. Obtained was a 68.8 %-solution of polyacetoacetate B having an acid number of 0.8 and a viscosity of 1.5 cPas.

Polyacetoacetate C

Into a reactor were charged 270 g of xylene, 270 g of white spirit (boiling point: 140°-165° C.), 540 g of ethylamyl ketone and 333.0 g of ethyl acetoacetate, which were heated to boiling temperature. Subsequently, a mixture of 421.9 g of hydroxyethyl methacrylate, 503.2 g of butyl acrylate and 774.0 g of styrene, and a mixture of 134.0 g of tert. butylperoxy-3,5,5 trimethyl hexanoate and 250 g of ethylamyl ketone were added separately over a period of 3 hours. Then 5.1 g of tert butylperoxy-3,5,5 trimethyl hexanoate and 47.0 g of ethylamyl ketone were added over a period of 30 minutes. Next, the reaction mixture was kept at boiling temperature for 2 hours. After cooling 6.4 g of dibutyltin oxide were added, after which the reaction mixture was heated to boiling temperature, with the ethanol evolved being removed by (azeotropic) distillation. After 5 hours 109.6 g of ethanol (93% of the theoretical amount) had been collected. Obtained was a 59.0%-solution of polyacetoacetate C having an acid number of 0.9 and a viscosity of 176 cPas.

Polyacetoacetate D

In a reactor 1416 parts of a bisglycidyl ether of Bisphenol-A (available under the trade mark Epikote 1007 of Shell Chemical), 1618 parts of xylene, 245.0 parts of ethyl acetoacetate and 3.5 parts of dibutyltin oxide were boiled under reflux at a temperature of 130°-140° C. under an atmosphere of nitrogen. 87.0 g of ethanol were removed by distillation over a period of 9 hours. Subsequently, after cooling to about 100° C., 51.0 parts of hexahydrophthalic anhydride were added and the reaction mixture was heated to reflux temperature (145° C.) for 6 hours, after which no more free anhydride was present. After successive cooling and adding the solvent, a 43%-solution of polyacetoacetate D was obtained in a mixture of xylene, n-butanol and butyl acetate in a weight ratio of 3.6:1, 0:4.2 and having a viscosity of 55 cPas. The resin solution had an acid number of 5.

Blocked polyamino amides A-C

As blocked polyamino amide A is used in the Examples the polyketimine built up from methylisobutyl ketone and a polyamino amide having an amine number of 345-370 (available under the trade mark Versamid 125 of Schering). The polyketimine had an equivalent weight of 325.5, calculated on solid constituents.

As blocked polyamino amide B is used the polyketimine built up from methylisobutyl ketone and a polyamino amide having an amine number of 80-110 (available under the trade mark Euredur 424 of Schering).

The polyketimine has an equivalent weight of 1269, calculated on solid constituents.

As blocked polyamino amide C is used the polyketimine built up from hexanone and a polyamino amide having an amine number of 170 (available under the trade mark Epilink 175 of Akzo Chemie). The polyketimine has a viscosity of 70 cPas.

Blocked amino compound D

As blocked amino compound D is used the polyketimine built up from methylisobutyl ketone and 3,3'-dimethyl-4,4'-diamino-dicyclohexyl methane. The polyketimine has an equivalent weight of 213, calculated on solid constituents.

EXAMPLES 1-12

Example 1

A coating composition was prepared by successively mixing 32.8 g of polyacetoacetate A, 8.3 g of a polyamino amide (available under the trade mark Euredur 424 of Schering), 7.8 g of blocked amino compound D and 1.6 g of nitroethane. To this mixture were added, with stirring, 48.2 g of water. The resulting composition had a solids content of 31.5%, an inversion point at a water content of 41.5% and a gel time of 8 hours. The composition was applied to a steel panel in a coating thickness of 51 μm and dried at an ambient temperature of 20° C. and a relative humidity of 70%. The coating applied was dust dry after 1½ hours and handleable after 3½ hours. The Persoz hardness was 43 seconds after 1 day and 101 seconds after 1 week. The coating was excellently resistant to water and very well resistant to premium grade petrol.

Example 2

A coating composition was prepared by successively mixing 17.6 g of polyacetoacetate A, 22.0 g of a polyamino amide having an amine number of 80-110 (available under the trade mark Euredur 424 of Schering) 5.3 g of 3,3'-dimethyl-4,4'-diaminodicyclohexyl methane and 7.7 g of nitroethane. Subsequently, 23.1 g of water were added, with stirring. The resulting composition had a solids content of 42.5%, an inversion point at a 19.5% water content and a gel time of 45 minutes. The composition was applied to a steel panel in a coating thickness of 77 μm and dried at an ambient temperature of 20° C. and a relative humidity of 70%. The coating applied was dust dry after 45 minutes and handleable after 1¾ hours. The Persoz hardness was 51 seconds after 1 day and 83 seconds after 1 week. The coating was well resistant to water and to premium grade petrol.

Example 3

A coating composition was prepared by successively mixing 24.0 g polyacetoacetate B, 24.0 g of a polyamino amide having an amide number of 370-410 (available under the trade mark Versamid 140 of Schering) and 4.0 g of methyl cyanoacetate. Subsequently, 48.0 g of water were added, with stirring. The resulting composition had a solids content of 34.3%, an inversion point at a 40.0% water content and a gel time of 5 hours. The composition was applied to a steel panel in a coating thickness of 55 μm and dried at an ambient temperature of 20° C. and a relative humidity of 70%. The coating applied was dust dry after 2½ hours and handleable after 6 hours. The Persoz hardness was 23 seconds after 1 day and 60 seconds after 1 week. The coating was well resistant to water and excellently resistant to premium grade petrol.

Example 4

A coating composition was prepared by successively mixing 39.0 g of polyacetoacetate B, 9.3 g of a polyamino amide having an amine number of 80-110 (available under the trade mark Euredur 424 of Schering), 16.1 g of blocked polyamino amide D and 5.3 g of nitroethane. Subsequently, 29.3 g of water were added, with stirring. The resulting composition had a solids content of 48.0%, an inversion point at a 26.6% water content and a gel time of 70 minutes. The composition was applied to a steel panel in a coating thickness of 54 μm and dried at an ambient temperature of 20° C. and a relative humidity of 70%. The coating applied was dust dry after 2½ hours and handleable after 7 hours. The Persoz hardness was 22 seconds after 1 day and 43 seconds after 1 week. The coating was very well resistant to water and well resistant to premium grade petrol.

Example 5

A coating composition was prepared by successively mixing 47.9 g of polyacetoacetate C, 8.9 g of a polyamino amide having an amine number of 80-110 (available under the trade mark Euredur 424 of Schering) 6.7 g of blocked polyamine compound D and 4.5 g of nitroethane. Subsequently, 32.0 g of water were added, with stirring. The resulting composition had a solids content of 39.4%, an inversion point at a 28.0% water content and a gel time of 4 hours. The composition was applied to a steel panel in a coating thickness of 55 μm and dried at an ambient temperature of 20° C. and a relative humidity of 70%. The coating applied was dust dry after 2 hours and handleable after 3½ hours. The Persoz hardness was 58 seconds after 1 day and 116 seconds after 1 week. The coating was very well resistant to water and to premium grade petrol.

Example 6

A coating composition was prepared by successively mixing 32.8 g polyacetoacetate C, 19.2 g of blocked polyamine compound C and 4.4 g of methyl cyanoacetate. Subsequently, 43.6 g of water were added, with stirring. The resulting composition had a solids content of 32.8%, an inversion point at a 38.2% water content and a gel time of 110 minutes. The composition was applied to a steel panel in a coating thickness of 47 μm and dried at an ambient temperature of 20° C. and a relative humidity of 70%. The coating applied was dust dry after 2 hours and handleable after 4 hours. The Persoz hardness was 10 seconds after 1 day and 38 seconds after 1 week. The coating was very well resistant to water and well resistant to premium grade petrol.

Example 7

A coating composition was prepared by successively mixing 44.5 g of polyacetoacetate D, 22.0 g of a polyamino amide having an amine number of 80-110 (available under the trade mark Euredur 424 of Schering), 3.9 g of blocked amino compound D and 5.0 g of methyl cyanoacetate. Subsequently, 23.7 g of water were added, with stirring. The resulting composition had a solids content of 34.4%, an inversion point at a 20.7% water content and a gel time of 20 minutes. The composition was applied to a steel panel in a coating thickness of 69 μm and dried at an ambient temperature of 20° C. and a relative humidity of 70%. The coating applied was dust dry after 1½ hours and handleable after 2½ hours. The Persoz hardness was 44 seconds after 1 day and 82 seconds after 1 week. The coating was excellently resistant to water and to premium grade petrol.

Example 8

A coating composition was prepared by successively mixing 31.3 g of polyacetoacetate A, 24.4 g of blocked polyamino amide A, and 2.7 g of nitroethane. To this mixture were added, with stirring, 41.6 g of water. The resulting composition had a solids content of 29.5%, an inversion point at a water content of 37.5% and a gel time of 1 hour. The composition was applied to a steel panel in a coating thickness of 42 μm and dried at an ambient temperature of 20° C. and a relatively humidity of 70%. The coating applied was dust dry after 1 hour and handleable after 1½ hours. The Persoz hardness was 18 seconds after 1 day and 25 seconds after 1 week. The coating was well resistant to water and to premium grade petrol.

Example 9

A coating composition was prepared by successively mixing 27.6 g of polyacetoacetate A, 23.2 g of blocked polyamino amide B and 3.1 g of methyl cyanoacetate. To this mixture were added, with stirring, 46.1 g of water. The resulting composition had a solids content of 31.5%, an inversion point at a water content of 40.5% and a gel time of 75 minutes. The composition was applied to a steel panel in a coating thickness of 50 μm and dried at an ambient temperature of 20° C. and a relative humidity of 70%. The coating applied was dust dry after 1¼ hours and handleable after 2 hours. The Persoz hardness was 21 seconds after 1 day and 42 seconds after 1 week. The coating was well resistant to water and to premium grade petrol.

Example 10

A coating composition was prepared by successively mixing 30.6 g of polyacetoacetate A, 8.2 g of a polyamino amide (available under the trade mark Euredur 424 of Schering), 7.1 g of blocked amino compound D and 3.1 g of methyl formiate. Subsequently, 51.0 g of water were added, with stirring. The resulting composition had a solids content of 51.0%, an inversion point at a water content of 41.0% and a gel time of 3½ hours. The composition was applied to a steel panel in a coating thickness of 42 μm and dried at an ambient temperature of 20° C. and a relative humidity of 70%. The coating applied was dust-dry after 1 hour and handleable after 2 hours. The Persoz hardness was 50 seconds after 1 day and 92 seconds after 1 week. The coating was excellently resistant to water and very well resistant to premium grade petrol.

Example 11

A coating composition was prepared by successively mixing 41.7 of polyacetoacetate C, 6.9 g of a polyamino amide having an amine number of 370–410 (available under the trade mark Versamid 140 of Schering) 6.9 g of blocked polyamine compound D and 2.8 g of ethyl formiate. Subsequently, 41.7 g of water were added, with stirring. The resulting composition had a solids content of 34.3%, an inversion point at a water content of 34.7% and a gel time of 3 hours. The composition was applied to a steel panel in a coating thickness of 57 μm and dried at an ambient temperature of 20° C. and a relative humidity of 70%. The coating applied was dust-dry after 1½ hours and handleable after 2½ hours. The Persoz hardness was by seconds after 1 day and 56 seconds after 1 week. The coating was very well resistant to water and to premium grade petrol.

Example 12

A coating composition was prepared by successively mixing 32.3 g of polyacetoacetate A, 26.9 g of blocked polyamino amide A and 2.3 g of isopropyl formiate. Subsequently, 37.6 g of water were added, with stirring. The resulting composition had a solids content of 36.7%, an inversion point at a water content of 32.3% and a gel time of 1 hour. The composition was applied to a steel panel in a coating thickness of 50 μm and dried at an ambient temperature of 20° C. and a relative humidity of 70%. The coating applied was dust-dry after ½ hour and handleable after 1¼ hours. The Persoz hardness was 43 seconds after 1 day and 72 seconds after 1 week. The coating was well resistant to water and to premium grade petrol.

We claim:

1. A water-dispersible aqueous coating composition based on a polyacetoacetate-comprising compound, said coating composition comprising:
   (a) an organic compound having at least 2 acetoacetate groups, wherein said organic compound is comprised of the reaction product of a polyol having two or more hydroxyl groups with a reactant selected from the group consisting of diketene and alkyl acetoacetate;
   (b) a curing agent comprising a polyamino amide having an amine number of 60–1,000 built up from a polyamine having 2–6 primary amino groups and 2–20 carbon atoms and a reactant selected from the group consisting of monocarboxylic acid, dicarboxylic acid and combinations thereof, wherein the carboxylic acid comprises from 2 to 40 carbon atoms; and
   (c) a dispersing agent selected from the group consisting of a nitroalkane having 1–6 carbon atoms; an organic compound occurring in at least 2 tautomeric forms, and in one of the tautomeric forms a labile hydrogen atom is linked to a carbon atom and which compound contains at least one carboxyl group or sulphonyl group; a formic acid ester having a solubility of at least 0.2 g in 100 g of water having a temperature of 20° C., with the exception of ter. butyl formiate; and combinations thereof.

2. The coating composition of claim 1 wherein the polamino amide curing agent is built up from a saturated aliphatic monocarboxylic acid having 1–24 carbon atoms.

3. The coating composition of claim 1 wherein the polyamino amide curing agent is built up from a dicarboxylic acid having 8–36 carbon atoms.

4. The coating composition of claim 1 wherein the polyamino amide curing agent is built up from a polyamine having 2–3 primary and 0–4 secondary amino groups.

5. The coating composition of claim 1 wherein the polyamino amide curing agent is built up from a polyamine of the formula

wherein the group $R_1$ and the n groups $R_2$ may be the same or different and represent an alkylene group having 2-6 carbon atoms and n is a number from 1-6.

6. The coating composition of claim 1 wherein the polyamino amide curing agent is built up from an aliphatic, cycloaliphatic or aromatic amino compound having 2 or 3 exclusively primary amino groups.

7. The coating composition of claim 1 wherein the polyamino amide coating agent has an amine number of 80-750.

8. The coating composition of claim 7 wherein the polyamino amide has an amine number of 200-600.

9. The coating composition of claim 1 wherein the polyamino amide curing agent is present as mixture of the polyamino amide and an amino compound in an amount of at least 3 equivalent %.

10. The coating composition of claim 9 wherein the polyamino amide is present in the unblocked form and the amino compound in the blocked form.

11. The coating composition of claim 1 wherein the organic compound having at least 2 acetoacetate groups, the polyamino amide and the amino compound, if any, are present in an amount such that the ratio of the number of equivalents of ethylenically unsaturated double bonds of the compound having acetoacetate groups to the number of equivalents of amine hydrogen is in the range of 0.3 to 3.0.

12. The coating composition of claim 11 wherein the ratio is in the range of 0.5 to 2.0.

13. The coating composition of claim 1 wherein the nitroalkane has 1-4 carbon atoms.

14. The coating composition of claim 13 wherein the nitroalkane is nitroethane or nitropropane.

15. The coating composition of claim 1 wherein the organic compound which occurs in at least 2 tautomeric forms is 2,4-pentanedione or methyl acetoacetate or ethyl acetoacetate or methyl cyanoacetate.

16. The coating composition of claim 1 wherein the formic acid ester is an ester of formic acid and a monovalent alcohol having 1-6 carbon atoms.

17. The coating composition of claim 16 wherein the formic acid ester is an ester of formic acid and a monovalent alcohol having 1-5 carbon atoms.

18. The coating composition of claim 1 wherein the formic acid ester is a formic acid ester of the general formula

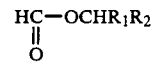

wherein $R_1$ and $R_2$ may be the same or different and represent a hydrogen atom or an alkyl group and the groups $R_1$ and $R_2$ together contain not more than 5 carbon atoms.

19. The coating composition of claim 1 wherein the formic acid ester is methyl formiate, ethyl formiate or isopropyl formiate.

20. The coating composition of claim 1 wherein the formic acid ester is an ester of formic acid and a bi-or polyvalent hydroxy compound having 2-8 carbon atoms.

21. The coating composition of claim 1 wherein the formic acid ester has a solubility of 0.2-50 g in 100 g of water having a temperature of 20° C.

22. The coating composition of claim 21 wherein the formic acid ester has a solubility of 0.5-35 g in 100 g of water having a temperature of 20° C.

23. The coating composition of claim 1 wherein the formic acid ester is present in an amount such that 0.3-2 equivalents of formiate are present per equivalent of nitrogen of the amino group-containing curing agent.

24. The coating composition of claim 1 wherein water is present in an amount of at least 15% by weight.

25. The coating composition of claim 24 wherein water is present in an amount of at least 25% by weight.

26. The coating composition of claim 1 wherein water is present in an amount of not more than 80% by weight.

* * * * *